United States Patent
Chow et al.

(10) Patent No.: US 7,032,017 B2
(45) Date of Patent: Apr. 18, 2006

(54) IDENTIFYING UNIQUE WEB VISITORS BEHIND PROXY SERVERS

(75) Inventors: Kingsum Chow, Hillsboro, OR (US);
Yong J. Chang, Hillsboro, OR (US);
Sandeep R. Nair, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 722 days.

(21) Appl. No.: 09/961,677

(22) Filed: Sep. 25, 2001
(Under 37 CFR 1.47)

(65) Prior Publication Data

US 2003/0061360 A1    Mar. 27, 2003

(51) Int. Cl.
*G06F 15/16* (2006.01)
(52) U.S. Cl. .................................... 709/223
(58) Field of Classification Search ............... 709/223, 709/227, 229
See application file for complete search history.

(56) References Cited

U.S. PATENT DOCUMENTS 5,961,593 A * 10/1999 Gabber et al. ............. 709/219
6,757,740 B1 * 6/2004 Parekh et al. ............. 709/245

* cited by examiner

*Primary Examiner*—David Y. Eng
(74) *Attorney, Agent, or Firm*—Pillsbury Winthrop Shaw Pittman LLP

(57) ABSTRACT

An arrangement is provided for identifying web site visitors. When a client behind a proxy server sends a browsing request for a web page at a web site hosted by a web server, the web server identifies a browsing session according to a session tag associated with the browsing session and uniquely identifies the client. A hit at the web page is recorded according to the session tag.

24 Claims, 12 Drawing Sheets

IDENTIFYING UNIQUE WEB VISITORS BEHIND PROXY SERVERS

RESERVATION OF COPYRIGHT

This patent document contains information subject to copyright protection. The copyright owner has no objection to the facsimile reproduction by anyone of the patent document or the patent, as it appears in the U.S. Patent and Trademark Office files or records but otherwise reserves all copyright rights whatsoever.

BACKGROUND

Aspects of the present invention relate to the World Wide Web. Other aspects of the present invention relate to monitoring web site visitors.

With the rapid advancement of the Internet, more and more companies develop web sites to advertise and sell their products. With increasing demand for web sites and for their maintenance arises, various services have emerged and continue to emerge to meet this increasing demand. For example, online services or OS provide web hosting services to companies that rely on third parties to develop and to maintain their web sites. As part of such services, OS often offers web site analysis and develops detailed traffic statistics on a customer's web site. For instance, visitors may be recorded and their browsing patterns may be analyzed. Reports about the characteristics of the visitors to a web site as well as their behaviors can be generated as part of the OS service product. Such reports may later be used to understand the effectiveness of a web site, to identify potential customers of different products, as well as to gather information that is useful to generate personalized profiles for individual customers.

Cookies have been used to differentiate visitors to a web site. Since cookies ties a user to an individual login, it serves as an accurate method to keep track of visitors. But, cookies may not be enabled at certain web sites or the browser at a client site may not permit their use. In this case, the Internet Protocol (IP) address of a client is often used to identify a visitor. This method may work well only when the customer's IP address is sent along with the HTTP request to the web server. However, many visitors, if not most nowadays, access the Internet from behind a proxy server which allows multiple users behind a firewall to share gateways to the Internet. When a client browses a web site through a proxy server, the IP address used to communicate with the web server that hosts the web site is the IP address of the proxy server. In this case, the client's IP address is hidden behind the proxy server. Therefore, the recorded hit (to the web site) based on the IP address does not correspond to the ultimate user, but rather to the proxy server only.

FIG. 1 depicts a mechanism in which a web server records hits based on the Internet Protocol addresses of the proxy servers through which clients send browsing requests, thus, it illustrates a scenario. A client site 110 includes at least one client (client 1 110a, client 2 110b, . . . , client n 110c) and connects to one or more proxy servers (120a, . . . , 120b) in a proxy server group 120. The client site 110 communicates with a web server 150 through a network 130 to browse a web site hosted at the web server 150. Each of the proxy servers in the proxy server group 120 has a distinct IP address that is reachable on the Internet. The web server 150 comprises web pages 150a, an IP address identification mechanism 150b, and visitor statistics storage 150c.

When a client (e.g., client 1 110a) sends a browsing request 125 (e.g., a URL address for a web page) to the web server 150, a proxy server (e.g., proxy server 120a) forwards the browsing request 125 using its public IP address (i.e., IP address 1) as the return address. When the web server 150 receives the browsing request 125, it retrieves the requested web page and returns it to the given return address or IP address 1 of the proxy server 1. At the same time, the IP address identification mechanism 150b records a hit from the IP address 1 and stores the information relevant to the hit in the visitor statistics storage 150c. When the proxy server 1 receives the requested web page, it forwards the page to the client 1. During the process of browsing the requested web page, the IP address of the client 1 is never exposed to the web server 150 so that the client 1 is never put on the record. In addition, when another client (e.g., client 2 110b) visits the same web site through the same proxy server 1, it will be recorded as from the same source (the IP address of the proxy server 1). The identities of individual clients are not recovered and recorded in this process.

The scheme shown in FIG. 1 may also lead to a different problem. When there are multiple proxy servers available in the proxy server group 120, a requested web page may be delivered through different proxy servers. For example, to balance the load on proxy servers, the proxy server group 120 may direct subsequent requests from a same client to the web server 150 via different proxy servers represented by different IP addresses (e.g., to IP address 1 representing the proxy server 1 120a and to IP address k representing the proxy server k 120b). In this case, the web server 150 may record the subsequent hits from the same client as from different sources. In both above described scenarios, the web site hits from visitors are not correctly recorded and this may further lead to inaccurate statistics and even incorrect characterization of the usage of an underlying web site.

BRIEF DESCRIPTION OF THE DRAWINGS

The inventions claimed and described herein are further described in terms of exemplary embodiments, which will be described in detail with reference to the drawings. These embodiments are non-limiting exemplary embodiments, in which like reference numerals represent similar parts throughout the several views of the drawings, and wherein:

DETAILED DESCRIPTION

The various inventions are described below, with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

A properly programmed general-purpose computer may perform the processing described below alone or in connection with a special purpose computer. Such processing may be performed by a single platform or by a distributed processing platform. In addition, such processing and functionality can be implemented in the form of special purpose hardware or in the form of software being run by a general-purpose computer. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

Figure 1:
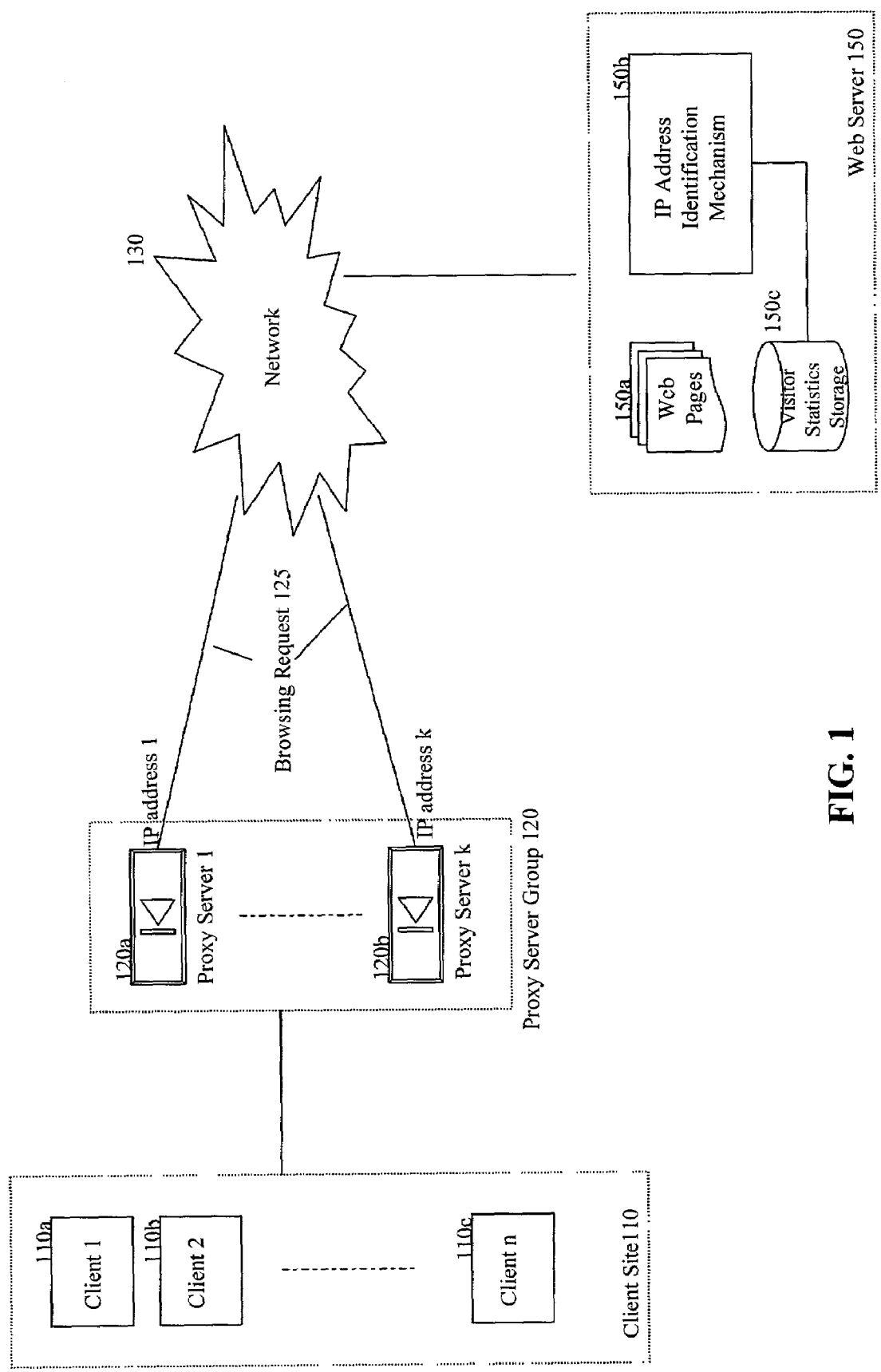
FIG. 1 depicts a mechanism in which a web server records hits based on the Internet Protocol addresses of the proxy servers through which clients send browsing requests.
Figure 2:
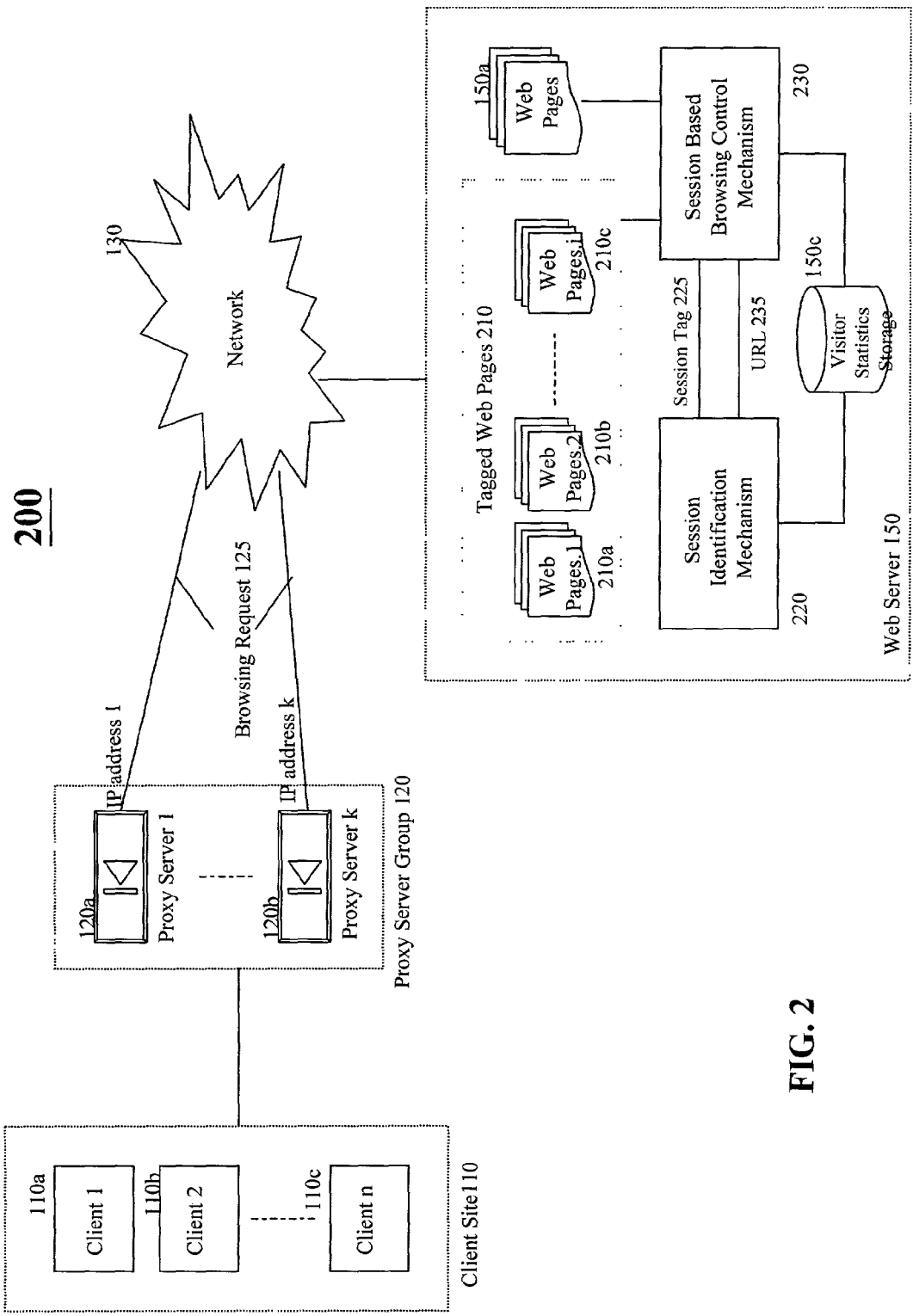
FIG. 2 depicts a mechanism in which a browsing request, sent from a client behind a proxy server to a web server, is recorded as a hit at the web server based on a unique session tag assigned to the browsing session associated with the client.

FIG. 2 depicts a mechanism 200 in which a browsing request, sent from a client behind a proxy server to a web server is recorded as a hit at the web server based on a unique session tag assigned to a browsing session associated with the browsing request. Mechanism 200 comprises a client site 110 which includes at least one client (client 1 110a, client 2 110b, . . . , client n 110c), a proxy server group 120 which includes at least one proxy server (proxy server 1 120a, . . . , proxy server k 120b), a web server 150 that hosts a web site, providing web content to the client site 110 through a network 130 via the proxy server group 120 and recording hits at the web pages 150a based on sessions tags associated with the clients behind the proxy server group 120.

A client at the client site 110 (e.g., client 1 110a) represents a generic communication device. It may be a personal computer connected to the proxy server group 120 in either a local area network (LAN) or a wide area network (WAN). It may also be a hand held device such as personal data assistant (PDA) or a cellular phone connecting to the proxy server group 120 wirelessly. Each client has its own address that is identifiable by the proxy server group 120. A client may connect to the proxy server group 120 as a whole and the information including both clients' request and requested web content, is delivered or forwarded via the proxy servers in the proxy server group 120. The proxy server group 120 may distribute delivery tasks among proxy servers according to various criteria. For example, load balancing may be achieved by evenly distributing jobs among proxy servers. Due to this, different objects on a single requested web page might be delivered to the requesting client via different proxy servers. Subsequent interactions between a client and the server 150 may be through different proxy servers.

Each proxy server in the proxy server group 120 has its own Internet protocol (IP) address, which is routable on the Internet. When a proxy server delivers a client's request to the web server 150, it uses its IP address as a return address so that the web server 150 can send the requested web content to this return address. During this process, without a cookie, the address of the client that makes the request is not exposed to the web server 150.

According to mechanism 200, during a browsing session, a client (e.g., client 1 110a) sends a browsing request 125 to the web server 150 through a proxy server (e.g., proxy server 120a) in the proxy server group 120. Such a browsing request may be transported through the network 130 using a well-known standard such as the HyperText Transport Protocol (HTTP). The request may represent a particular web page, which may be specified using an address expressed in terms of Universal Resource Locator (URL) protocol. The browsing request 125 may also include information such as referrer representing, for example, the URL of the web site from where the current URL is obtained. When the web server 150 receives the request 125, it retrieves the requested web page, creates a duplicate of the web page (e.g., web pages. 1) tagged with a (session) tag associated with the browsing session with the client (110a), and sends the tagged web page to the client.

As far as the requesting client is concerned, the content of a tagged web page, created based on the requested web page with inserted session tags, is identical to the content of its original web page. The only difference may be that the URL of the tagged web page and the URLs of the links in the tagged web page are inserted with a session tag that uniquely identifies the current browsing session associated with the client. Based on such inserted session tags, when subsequent requests from the same browsing session arrive, the web server 150 is able to recognize the corresponding browsing session of the client.

The web server 150 comprises a plurality of web pages 150a, a plurality sets of duplicate web pages 210a, 210b, . . . , 210c, each of which is created based on the web pages 150a, a session identification mechanism 220, a session based browsing control mechanism 230, and a visitor statistics storage 150c. Upon receiving the browsing request 125, the session identification mechanism 220 parses the request 125 and determines whether the received request 125 is a subsequent request of an active browsing session. The determination may be made according to certain criteria, which will be discussed later in referring to FIG. 6 and FIG. 7. If it is a subsequent request from an active browsing session, a session tag is extracted from the browsing request 125. If the request represents a new browsing session, the session identification mechanism 220 generates a new and unique session tag and assigns it to the new browsing session. A session tag 225, representing either a new or an existing browsing session, is then fed, together with a URL 235, representing the requested web page extracted from the browsing request 125, to the session based browsing control mechanism 230.

The session based browsing control mechanism 230 retrieves a web page based on the URL 235 and generates a duplicate with appropriately inserted session tag 225. The duplicate may be stored as a tagged web page 210 together with other tagged web pages that are requested and duplicated previously in the same browsing session. The session based browsing control mechanism 230 then sends the duplicate of the requested web page to the return IP address representing the requesting client via the proxy server group 120.

The web server 150 also records the hit at the requested web page and may update different statistics such as the frequency of visits to a particular web page based on recorded hits. The mechanism 200 provides a facility to record the hits based on different browsing sessions. That is, requests for web pages from a same browsing session are recorded as the hits from the same source. This is realized by utilizing the session tags to trace the source of the hits. Recording hits in this fashion is independent of the proxy server(s) through which the requests and web content are forwarded.

Figure 3:
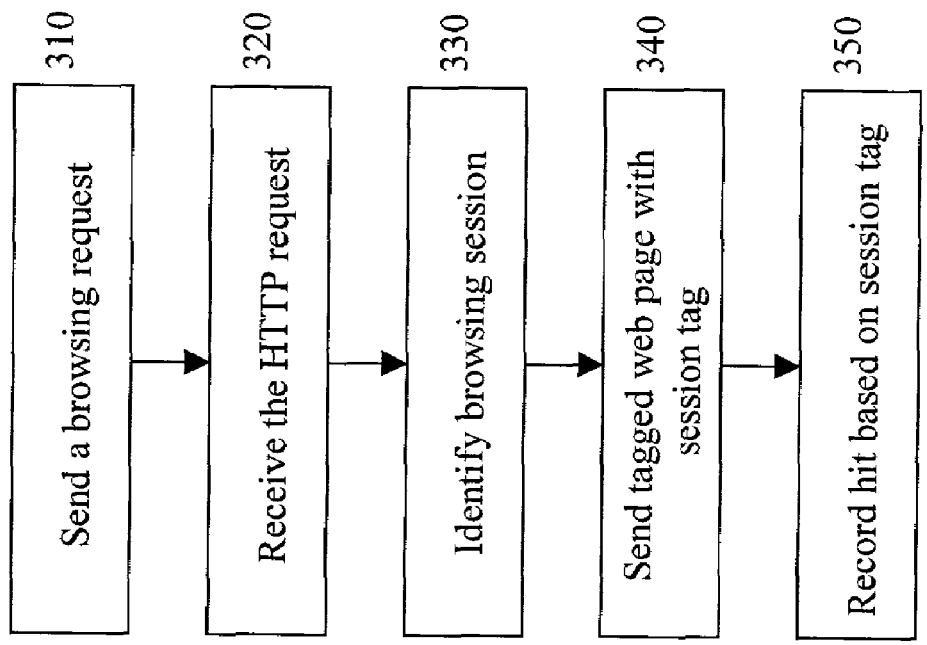
FIG. 3 is an exemplary flowchart of a process, in which hits to a web site are recorded with respect to browsing sessions according to unique session tags inserted into tagged web pages of the web site.

FIG. 3 is an exemplary flowchart of a process, in which hits to a web page are recorded with respect to browsing sessions, representing a underlying client behind a proxy server, according to unique session tags inserted into tagged web pages of a web site. A client behind a proxy server first sends, at act 310, a browsing request to the web server 150. Upon receiving the browsing request at act 320, the web server 150 identifies, at act 330, the browsing session. The requested web page is retrieved, tagged with a unique session tag, and sent, at act 340, to the client. The hit at the requested web page is then recorded, at act 350, using the session tag as the identity of the source of the hit.

Figure 4:
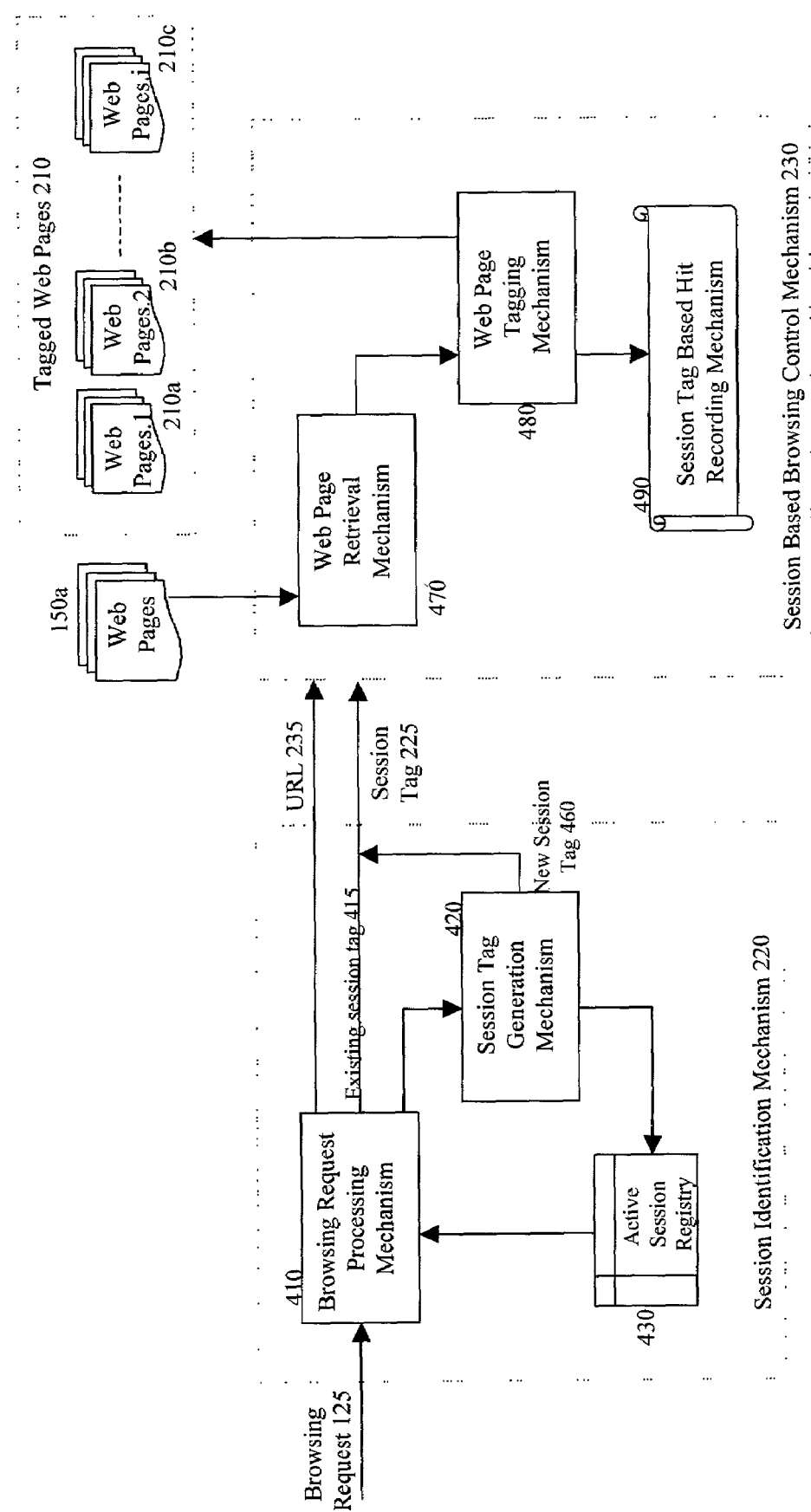
FIG. 4 depicts an exemplary internal structures of a session identification mechanism and a session based browsing control mechanism in relation to a plurality sets of tagged web pages.

FIG. 4 depicts an exemplary internal structures of the session identification mechanism 220 and the session based browsing control mechanism 230 in relation to a plurality sets of tagged web pages 210. The session identification mechanism 220 includes a browsing request processing mechanism 410, a session tag generation mechanism 420, and an active session registry 430. Upon receiving the browsing request 125, the request processing mechanism 410 parses the request to extract useful information such as the URL 235 of the requested web page, the referrer information, and existing session tags 415. Based on extracted information, the request processing mechanism 410 determines whether the browsing request 125 corresponds to a subsequent request of an existing browsing session.

If the browsing request 125 represents the start of a new browsing session, the request processing mechanism 410 activates the session tag generation mechanism 420 to generate a new session tag 460 for the new browsing session. The session tag generation mechanism 420 further registers the newly generated session tag 460 with the active session registry to record a new active browsing session. The session tag 225, either corresponds to the existing tag 415 or the new session tag 460, is then sent, together with the URL 235 representing the requested web page, to the session based browsing control mechanism 230.

The session based browsing control mechanism 230 comprises a web page retrieval mechanism 470, a web page tagging mechanism 480, and a session tag based hit recording mechanism 490. The web page retrieval mechanism 470 retrieves the requested web page based on the URL 235. The retrieved web page is fed to the web page tagging mechanism 480 so that a tagged duplicate can be created (tagged web page). The tagged web page is then sent to the requesting client.

The session tag based hit recording mechanism 490 records the hit at the requested web page based on the session tag 225. Since a session tag is persistent across subsequent browsing requests during an active browsing session, it is used to identify the client that conducts the browsing session behind the proxy server group 120. That is, a session tag serves as an identification of the source of the hit. The session tag based hit recording mechanism 490 may also update certain statistics stored in the visitor statistics storage 150c based on the recorded hits.

Figure 5:
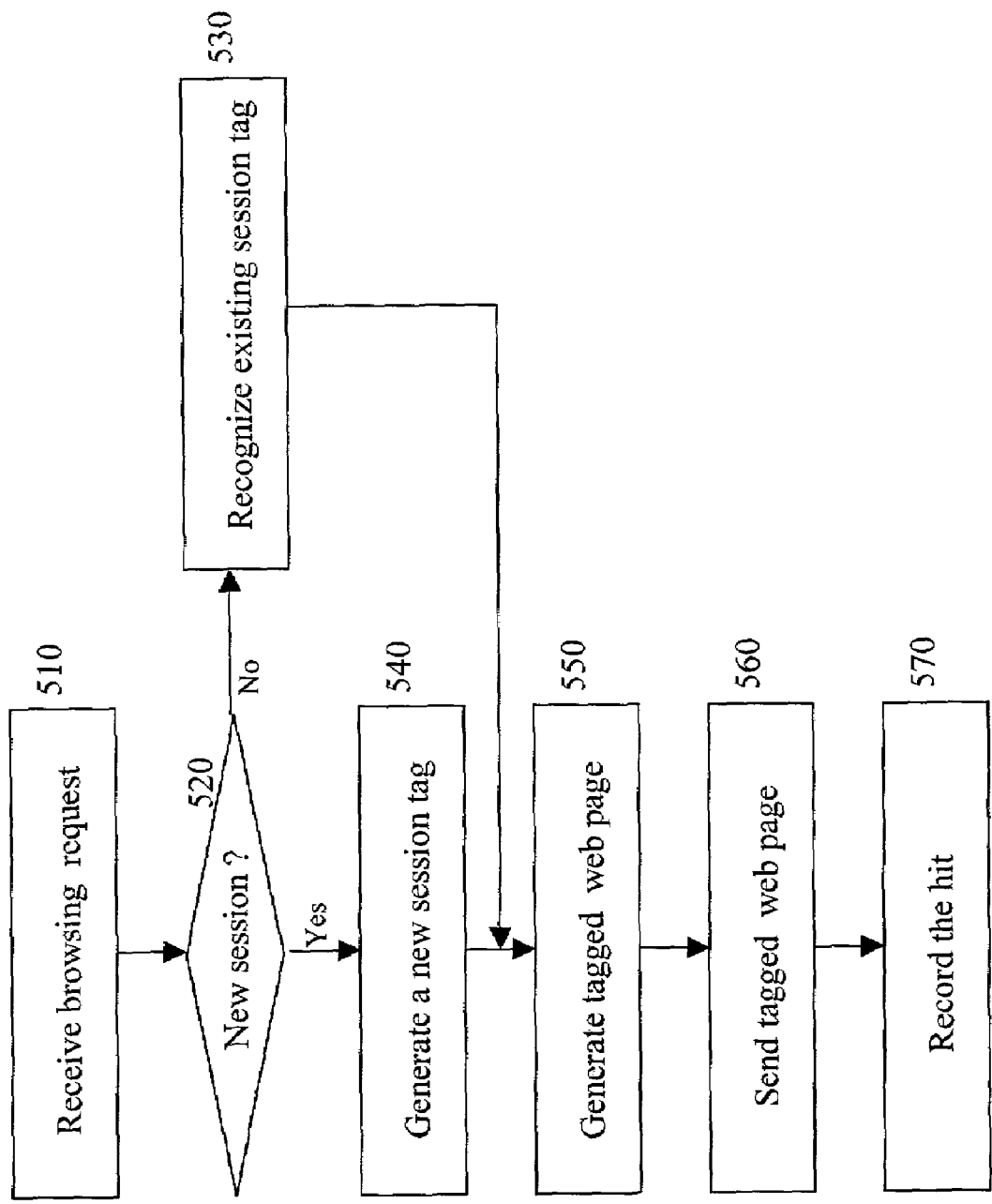
FIG. 5 is an exemplary flowchart of a process, in which a web server records hits from a client behind a proxy server based on unique session tags.

FIG. 5 is an exemplary flowchart of a process, in which the web server 150 records hits from a client behind a proxy server based on unique session tags. The web server 150 receives, at act 510, a browsing request. Based on information contained in the request, the request processing mechanism 410 determines, at act 520, whether the browsing request represents a new browsing session. If it is a new browsing session, a new session tag is generated, at act 540, to uniquely identify the session. If the browsing request is a subsequent request of an existing session, the existing session tag is extracted, at act 530, from the browsing request.

The session tag (either the extracted or newly generated) is then used, at act 550, to transform the requested web page, retrieved based on the URL specified in the request, into a tagged web page. The tagged web page is then sent, at act 560, to the requesting client. The web server 150 records, at act 570, the hit at the requested web page based on the session tag.

Figure 6:
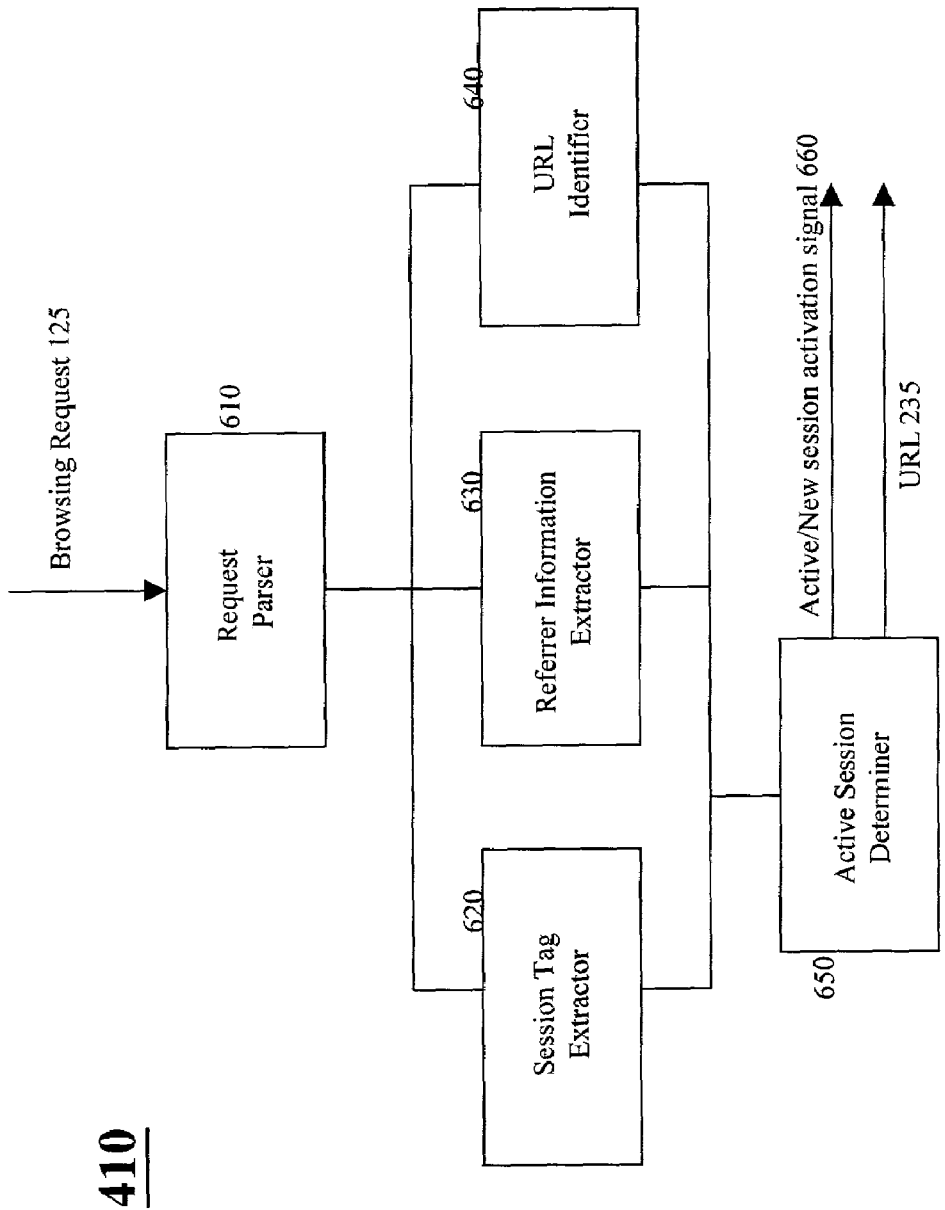
FIG. 6 depicts an exemplary internal structure of a browsing request processing mechanism.

FIG. 6 depicts an exemplary internal structure of the browsing request processing mechanism 410. As discussed earlier, the functionality of the request processing mechanism 410 is to parse the request, to extract useful information, and to determine, based on the extracted information, whether received browsing request corresponds to a new browsing session. As shown in FIG. 6, the request processing mechanism 410 may comprise a request parser 610, a session tag extractor 620, a referrer information extractor 630, a URL identifier 640, and an active session determiner 650.

The request parser 610 parses a browsing request 125. The browsing request 125 may be sent according to some known standard such as HTTP and may include such information as the URL of the web page being requested and the reference URL from where the URL of the requested web page is issued. For example, if the URL for a requested web page is http://www.cnn.com/headline-news.html, the reference URL may be http://www.cnn.com/index.html. In this case, the reference URL or the referrer may represent the home page of the requested web page. As another example, http://www.cnn.com/index.html may be the referrer of a requested web page with URL http://www.money-market.com/stock-quote.html. In this case, the referrer is not the home page of the requested web page.

The referrer information extractor 630 extracts referrer information 635 from a browsing request. Using the examples illustrated above, the extracted referrers correspond to URLs http://www.cnn.com/index.html and http://www.money-market.com/stock-quote.html, respectively. Referrer information may include a session tag such as http://www.cnn.com/index-1.html, wherein the "-1" is a session tag. The browsing request 125, however, may not necessarily contain referrer information. For example, if a client types http://www.cnn.com in a browser, there is no referrer in this case. Therefore, the extraction result of the referrer information extractor 630 may be a URL or simply blank.

The URL identifier 640 extracts the URL 235 of the requested web page from the browsing request 125. The URL 235 identifies a specific web page. For example, http://www.cnn.com/headline-news.html identifies a specific web page from CNN's web site that displays the summaries of all the headline news of the day. The extracted URL 235 is to be used to retrieve the requested web page based on which a tagged web page is to be generated for the underlying browsing session and tagged with the session tag 225. Similar to the referrer information, the URL 235 may also contain a session tag (how a session tag is incorporated into a URL is discussed later in referring to FIGS. 10-12. The session tag extractor 620 identifies an existing session tag from the browsing request 125.

The active session determiner 650 determines whether the current browsing request 125 is a subsequent request of an active browsing session. For example, if a client requests http://www.cnn.com first and then request http://www.cnn.com/headline-news.html, the second request is a subsequent request of an active browsing session started when the request http://www.cnn.com is received. If a request is not a subsequent request of an active browsing session, it corresponds to a new browsing session.

To determine whether the browsing request 125 is a subsequent request of an active browsing session, different kinds of information may be used to assist the active session determiner 650 to make the decision. For example, if the referrer information 635 is blank (i.e., there is no referrer), the browsing request 125 does not correspond to any active browsing session. If the referrer is different from the home page of the requested web page (i.e., the referrer is from a different web site and the browsing request 125 corresponds to the first request for the web site hosted by the web server 150), the browsing request 125 does not correspond to an active browsing session.

If the referrer information is the same as the URL of the home web site and has a session tag, the browsing request 125 is not a first hit and the browsing session that corresponds to the session tag is the active browsing session of the request 125. If the referrer information is blank but the browsing request 125 contains a session tag, it may be inferred that the URL 235 of the request is a forwarded URL. In this case, even though there is a session tag in the request, it does not correspond to any active browsing session. A new session tag may be generated to identify the new session.

When the browsing request 125 is identified as associated with an active session, the session tag is extracted from the referrer information as an active session tag and an active session signal is sent. When the browsing request 125 is identified as the start of a new session, the active session determiner 650 sends a new session activation signal 660 to invoke the session tag generation mechanism 420 (FIG. 4) to generate a new session tag to identify the new session.

Figure 7:
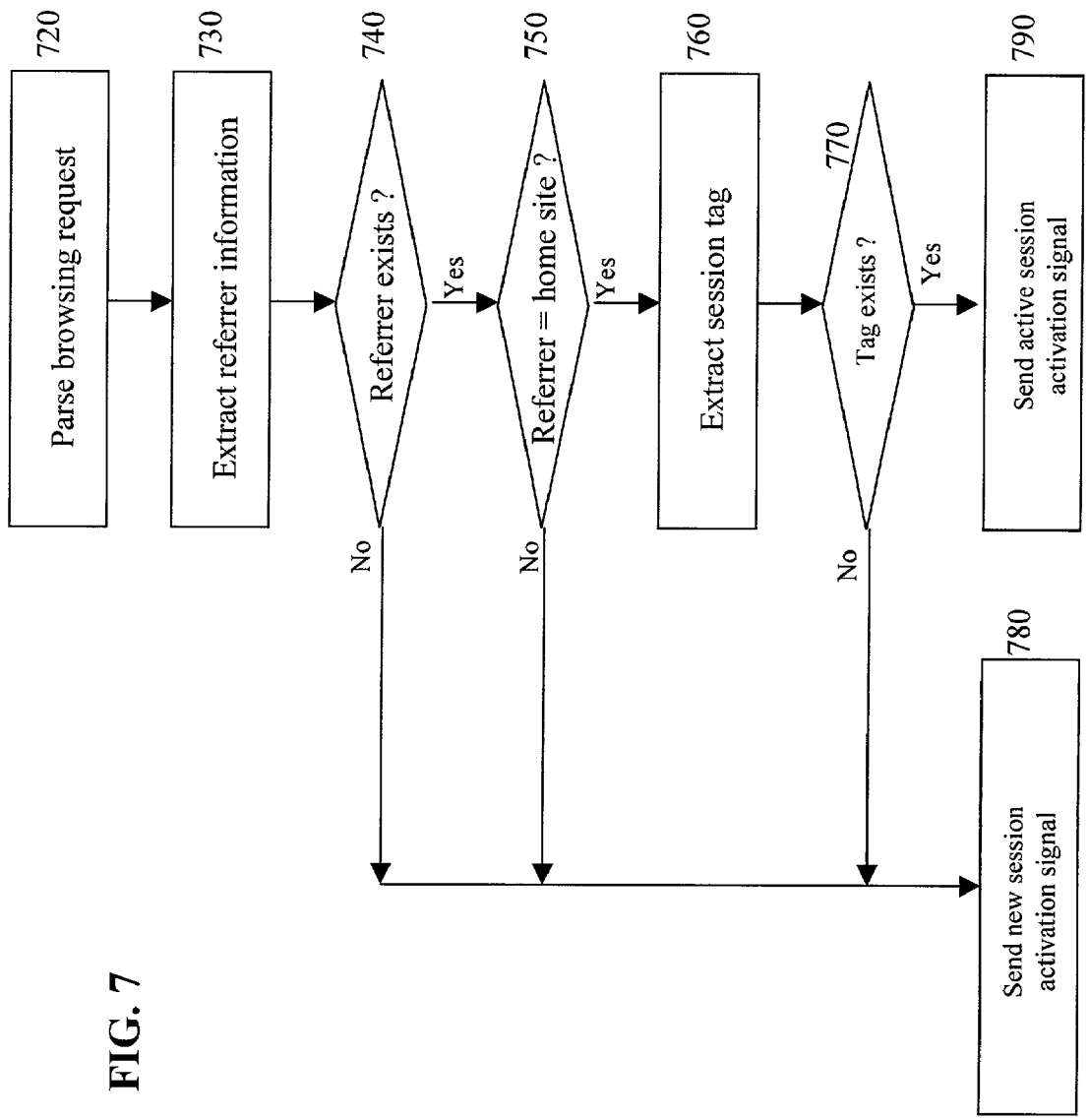
FIG. 7 is an exemplary flowchart of a process, in which a browsing request processing mechanism distinguish an existing browsing session from a new browsing session based on referrer information and session tags.

FIG. 7 is an exemplary flowchart of a process, in which the browsing request processing mechanism 410 distinguishes an existing browsing session from a new browsing session based on referrer information and a session tag. The browsing request 125 is first parsed at act 720. The referrer information extractor 630 extracts, at act 730, the referrer information. If a referrer exists, determined at act 740, the referrer information is further examined, at act 750, to see whether the referrer information is identical to the URL of the home web site. If the referrer information is the same as the URL of the home web site, the session tag extractor 620 extracts, at act 760, a session tag from the referrer information.

If the session tag is successfully extracted, determined at act 770, the browsing request 125 is a subsequent request in an existing browsing session. In this case, the session tag corresponding to the existing session, is sent, at act 790, to the session based browsing control mechanism 230 (FIG. 4).

If the referrer information does not contain a session tag, the browsing request 125 represents the first hit of a new browsing session. In addition, if the referrer information is blank, determined at act 740 and if the referrer information is different from the URL of the home web site, determined at act 750, the browsing request 125 also represents the first hit of a new browsing session. In these cases, the active session determiner 650 sends, at act 780, a new session activation signal to the session tag generation mechanism 420.

Figure 8:
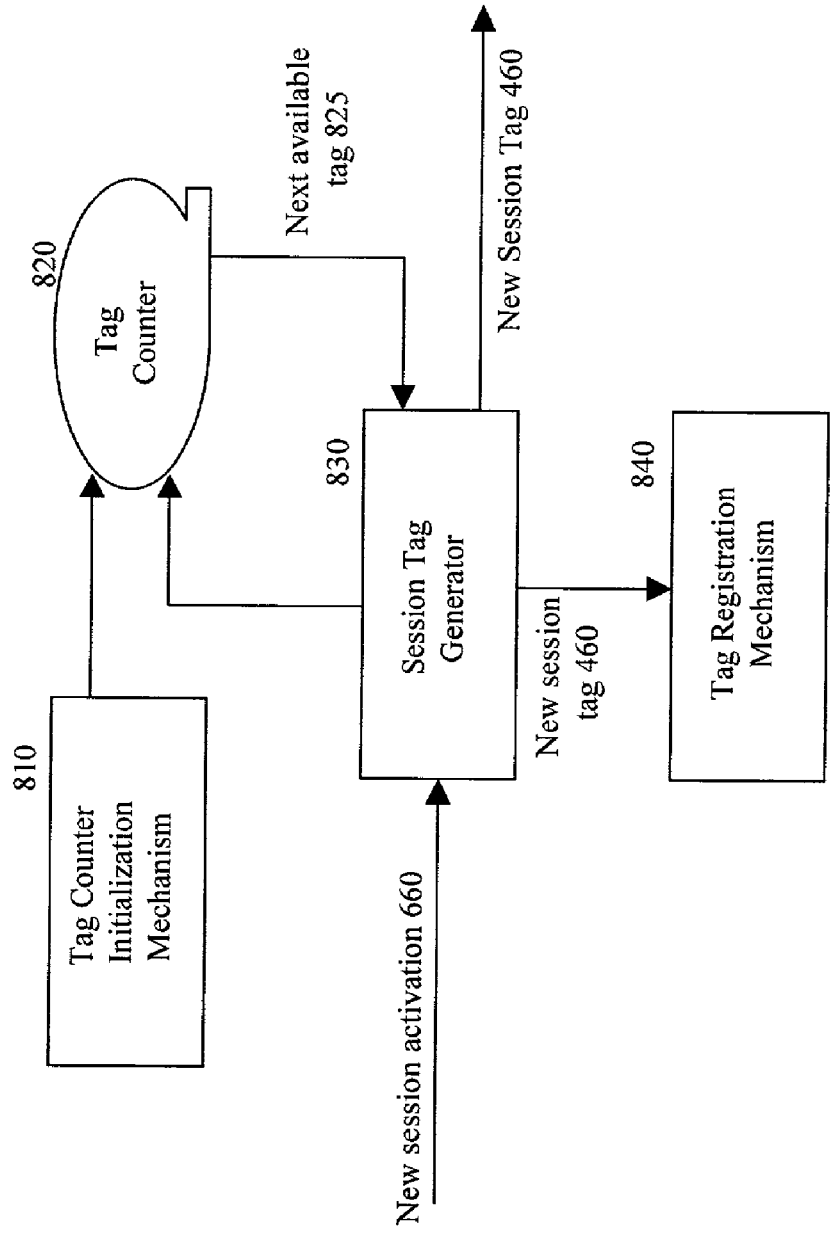
FIG. 8 depicts an exemplary internal structure of a session tag generation mechanism.

FIG. 8 depicts an exemplary internal structure of the session tag generation mechanism 420, which comprises a tag counter 820, a tag counter initialization mechanism 810, a session tag generator 830, and a tag registration mechanism 840. The tag counter 820 provides a next available tag 825. The tag counter 820 may supply available tags in such a fashion that the uniqueness of the tags is ensured. For example, it may determine the next available tag in a serial and non-repeating way such as 1,2,3, . . . . The tag counter initialization mechanism 810 serves the purpose of initializing the tag counter 820. For instance, through the tag counter initialization mechanism 810, the next available tag in the tag counter 820 may be reset to an initial value.

Based on the next available tag 825, the session tag generator 830 issues, upon being invoked by the new session activation signal 660, a new session tag 460. The new session tag 460 may correspond directly to the next available tag 825 or it may also be a transformation of the next available tag 825. For example, the session tag generator 830 may use the next available tag 825 as a seed to generate a unique session tag to represent a new browsing session. Different known approaches such as hashing may be deployed to perform the transformation. The generated new session tag 460 is then fed to the tag registration mechanism 840 where the new browsing session is registered with the active session registry 430. The registration may be based on the new session tag 460. The new session tag 460 is also sent to the session based browsing control mechanism 230 where it is used to tag the web page retrieved based on the browsing request 125 to generate a tagged web page.

Figure 9:
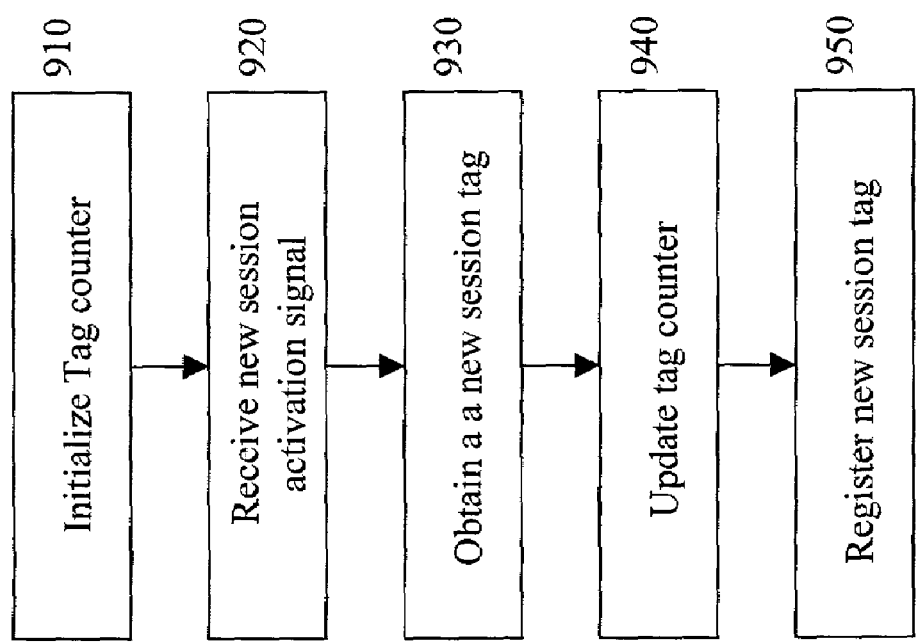
FIG. 9 is an exemplary flowchart of a session tag generation process.

FIG. 9 is an exemplary flowchart of the session tag generation process. The tag counter 820 is first initialized at act 910. A new session activation signal 660 is received at act 920. Upon receiving the new session activation signal 660, the session tag generator 830 obtains, at act 930, the next available tag from the tag counter 820 and generates a new session tag (460). The tag counter 820 is then updated at act 940 so that a new next available tag is generated. The new session tag (460) is used to represent a new browsing session which is then registered, at act 950, with the active session registry 430 based on the new session tag 460.

As depicted in FIG. 4, when the browsing request 125 represents a new browsing session, the new session tag 460, generated to identify the new browsing session, is sent, from the session tag generation mechanism 420, to the session based browsing control mechanism 230. When the browsing request 125 is identified as a subsequent request of an existing (active) browsing session, the session tag extracted from the browsing request 125 is sent, from the request processing mechanism 410, to the session based browsing control mechanism 230. When a session tag 225 and URL 235 are received, the session based browsing control mechanism 230 generates a tagged web page based on a web page retrieved according to the URL 235 and the session tag 225, representing the browsing session associated with the request and sends the tagged web page to the client that issues the request.

Figure 10:
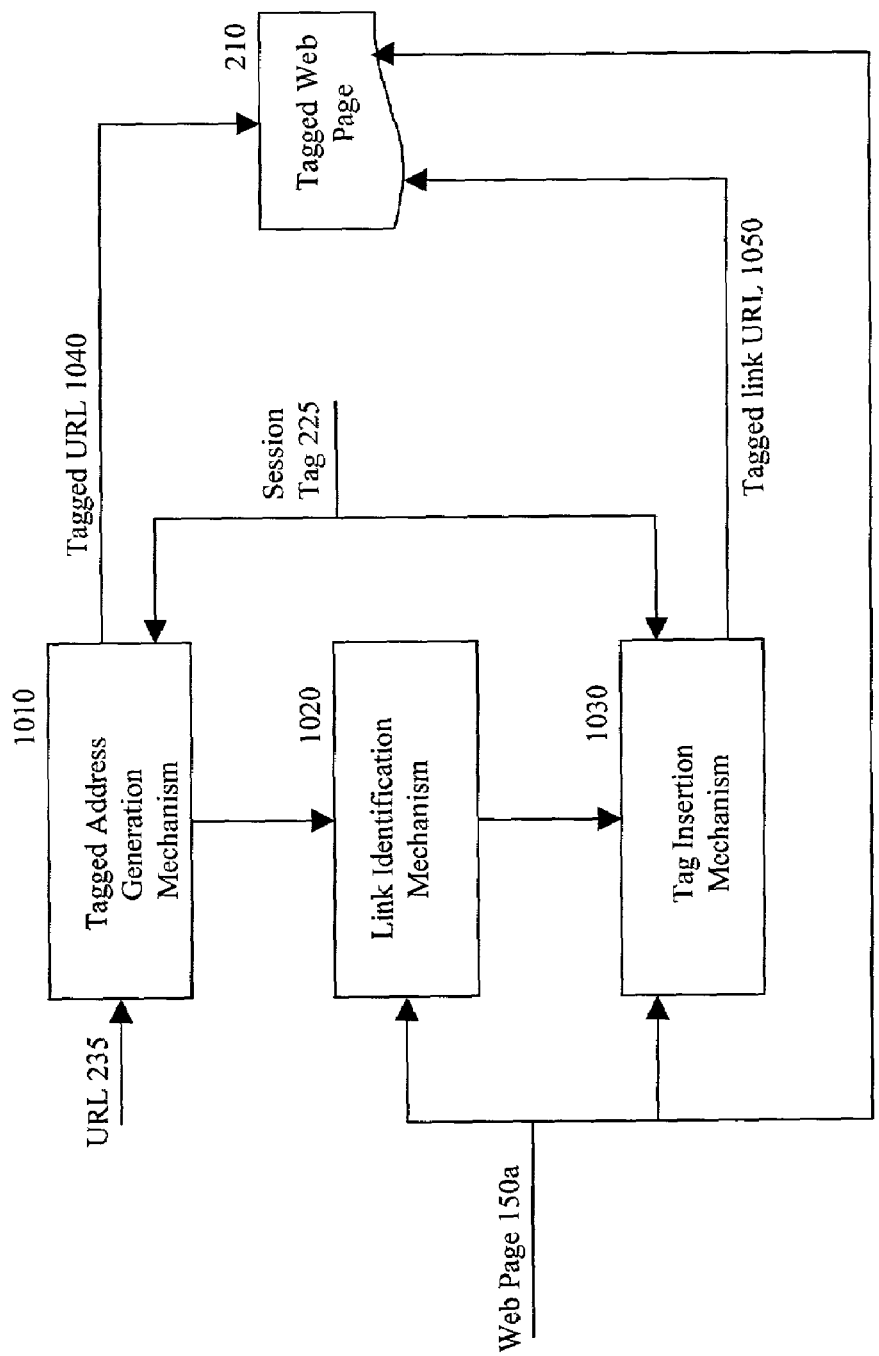
FIG. 10 depicts an exemplary internal structure of a web page tagging mechanism.

Tagging a web page is performed by the web page tagging mechanism 480. FIG. 10 depicts an exemplary internal structure of the web page tagging mechanism 480, which includes a tagged address generation mechanism 1010, a link identification mechanism 1020, and a tag insertion mechanism 1030. When a web page is retrieved based on the URL 235, a duplicate of the web page is created for the underlying browsing session. Different copies of the web page may be created for different browsing sessions. Each of the copies may comprise a plurality of copied web pages, tagged with a unique session tag that identifies a distinct browsing session. For example, the URLs in a tagged web page may be tagged with a unique session tag and the links in the tagged web pages may also be tagged using the same session tag.

Figure 11A:
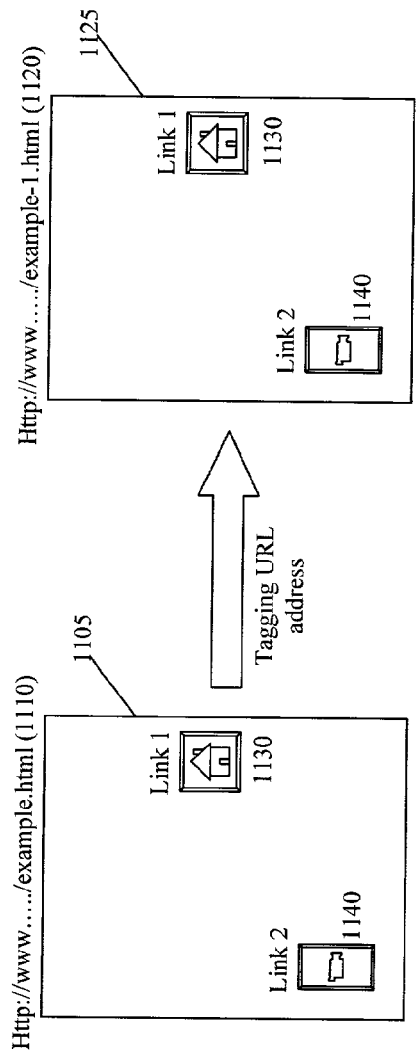
FIG. 11(a) and FIG. 11(b) illustrate different aspects of tagging a web page.
Figure 11B:
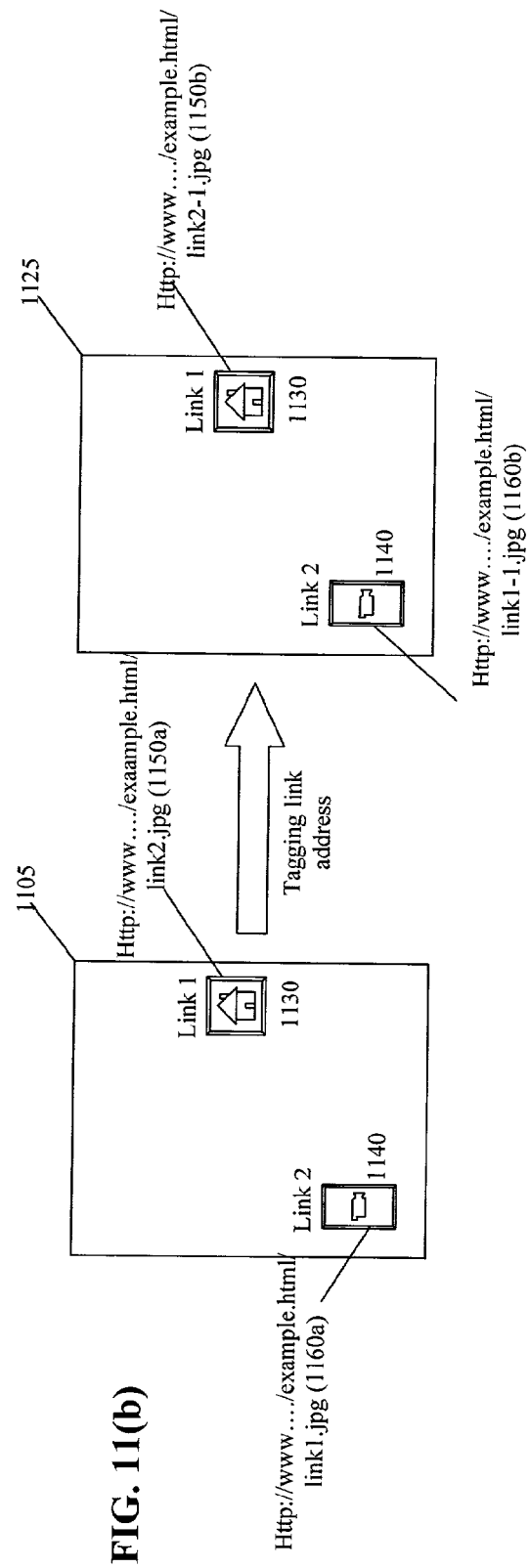

FIG. 11(*a*) and FIG. 11(*b*) illustrate different exemplary aspects of tagging a web page. In FIG. 11(*a*), a web page 1105 has an original URL address http://www..../example-.html (1110). When a copy of this page is duplicated for a browsing session is created, the URL of the copy can be generated by tagging the original URL. For instance, during URL address tagging, the original URL address 1110 is tagged to generate a tagged URL http://www..../example-1.html (1120), wherein "–" indicates that a tag follows and "1" is a tag inserted into the original URL that indicates that the tagged web page is for browsing session "1".

A different aspect of tagging a web page refers to tagging the links contained in a web page. For example, in FIG. 11(*b*), the original web page 1105 contains two links, a link 1 1130 and a link 2 1140. The link 1 1130 in the original web page 1105 has a URL http://www..../example.html/link1.jpg (1150*a*) and the link 2 1140 in the same web page has a URL http://www..../example.html/link2.jpg (1160*a*). Both links may be tagged using a browsing session tag (e.g., tag "1"). For example, for browsing session "1", the original URL address for link 1 may be tagged as http://www..../example-1.html/link1-1.html (1150*b*)

Referring again FIG. 10, the tagged address generation mechanism 1010 generates a tagged URL 1040 for a web page based on a given URL 235 and a given session tag 225. The link identification mechanism 1020 identifies the URLs of the links in a given web page (e.g., 150*a*) and sends the identified links to the tag insertion mechanism 1030. The tag insertion mechanism 1030 inserts the given session tag 225 into the URLs of the identified links to generate tagged link URLs 1050. Based on the given web page (150*a*), the tagged URL 1040, and the tagged link URL 1050, a tagged web page 210 is formed.

Figure 12:
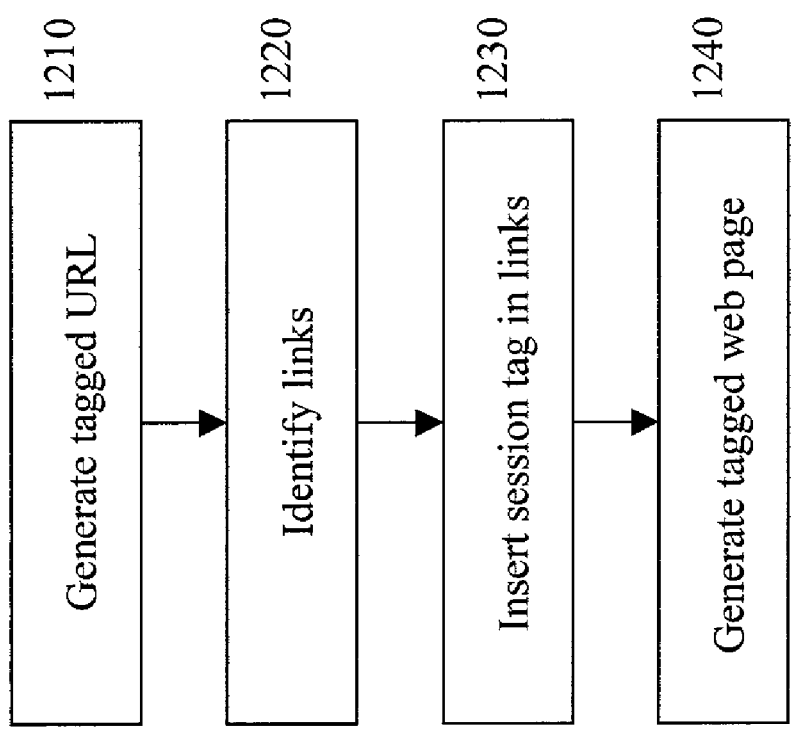
FIG. 12 is an exemplary flowchart of a process, in which a web page is tagged using a unique session tag.

FIG. 12 is an exemplary flowchart of a process, in which a web page is tagged using a unique session tag. A tagged URL is first generated at act 1210 based on a given original URL and a given session tag. Links in the web page are then identified at act 1220. The same session tag is then inserted, at act 1230, into the URLs of the links to generate tagged link URLs. Using the tagged URL for the web page and the tagged link URLs, a tagged web page is generated at act 1240 as a copy of the original web page for the underlying browsing session.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and, materials, such as are within the scope of the appended claims.

What is claimed is:

1. A method for identifying a unique visitor behind a proxy server, comprising:
    sending, from a client located behind the proxy server connected to a network, a browsing request for a web page to a web server connected to the network;
    receiving, by the web server, the browsing request;
    determining if the browsing request includes a session tag;
    generating, by the web server, a session tag to identify a unique visitor, when the browsing request lacks a session tag and associating the session tag with the browsing request;
    identifying a browsing session according to a session tag associated with the browsing request; and
    recording a hit at the web page from the client based on the session tag indicating that a unique visitor has accessed the web page.

2. The method according to claim 1, further comprising:
    sending, from the web server to the client via the network, the requested web page.

3. A method for identifying a unique web visitor behind a proxy server, comprising:
    receiving, by a web server, a browsing request for a web page of a web site from a client behind the proxy server;
    determining if the browsing request includes a session tag;
    generating, by the web server, a session tag to identify a unique visitor, when the browsing request lacks a session tag and associating the session tag with the browsing request;
    identifying a browsing session according to a session tag associated with the browsing request;
    generating a tagged web page based on the web page and the session tag;
    sending the tagged web page to the client via the proxy server; and
    recording a hit at the web page from the client based on the session tag indicating that a unique visitor has accessed the web page.

4. The method according to claim 3, wherein the identifying a browsing session comprises:
    determining whether the browsing request from the client corresponds to a new browsing session or an existing browsing session;
    identifying, if the browsing request corresponds to an existing browsing session, the session tag associated with the existing browsing session; and
    generating, if the browsing request corresponds to the new browsing session, a new session tag for the new browsing session associated with the client.

5. The method according to claim 4, wherein the generating the session tag includes:
    obtaining a next available tag to form the new session tag that uniquely identifies the new browsing session; and
    registering the new browsing session as an active browsing session using the new session tag.

6. The method according to claim 3, wherein the generating a tagged web page includes:
    generating a tagged address for the web page based on the web page and the session tag;
    identifying an address associated with each link in the web page;

inserting the session tag into the address associated with each link to generate a tagged link address for each link in the web page; and generating the tagged web page based on the web page, the tagged address, and the tagged link address for each link in the web page.

7. A method for identifying a unique web visitor behind a proxy server, comprising:

receiving, by a web server, a browsing request for a web page of a web site from a client behind the proxy server;

extracting, from the browsing request, a session tag;

determining that the browsing request corresponds to the new browsing session if the session tag can not be extracted from the browsing request; and determining that the browsing request corresponds to the existing browsing session associated with the extracted session tag;

identifying, if the browsing request corresponds to an existing browsing session, the session tag associated with the existing browsing session;

generating, if the browsing request corresponds to the new browsing session, a new session tag for the new browsing session associated with the client;

generating a tagged web page based on the web page and the session tag;

sending the tagged web page to the client via the proxy server;

recording a hit at the web page from the client based on the session tag indicating that a unique visitor has accessed the web page.

8. A system for identifying a unique visitor behind a proxy server comprising:

a client, located behind at least one proxy server connecting to a network, for browsing web sites via the at least one proxy server; and a web server connected to the network and representing a web site, for providing web site content through tagged web pages, generating a session tag used to identify a unique visitor and for recording a hit at the web site based on the session tag indicating that a unique visitor has accessed the web page, wherein the session tag is used to generate the tagged web pages, and the hit is recorded when a browsing request from the client lacks a session tag.

9. The system according to claim 8, wherein the web server includes:

a session identification mechanism for identifying a browsing session, associated with the browsing request received from the client, based on the session tag and referrer information extracted from the browsing request; and a session based browsing control mechanism coupled to the session identification mechanism for generating a tagged web page of the tagged web pages based on the browsing request using the session tag that uniquely identifies the client during the browsing session, and for recording the hit at the tagged web page according to the session tag.

10. The system according to claim 9, wherein the session identification mechanism includes:

a browsing request processing mechanism for processing the browsing request to identify an active browsing session as the browsing session of the browsing request;

an active session registry for registering active browsing sessions based on the session tag associated with each active browsing session of the active browsing sessions; and a session tag generation mechanism for generating, for a new browsing session, a new session tag which is used to register the new browsing session in the active browsing session registry.

11. The system according claim 10, wherein the session based browsing control mechanism includes:

a web page retrieval mechanism for retrieving a web page according to the browsing request from the client;

a web page tagging mechanism for tagging the retrieved web page to generate the tagged web page using the session tag associated with the browsing session corresponding to the client; and a session tag based hit recording mechanism for recording the hit at the web page from the client according to the session tag that uniquely identifies the client.

12. A system for identifying a unique visitor behind a proxy server comprising:

a session identification mechanism for identifying a browsing session, associated with a browsing request received from a client, based on a session tag and referrer information extracted from the browsing request; and a session based browsing control mechanism coupled to the session identification mechanism for generating a tagged web page based on the browsing request using a session tag generated by a webserver that uniquely identifies the client during the browsing session, and for recording a hit at the tagged web page according to the session tag indicated that a unique visitor has accessed the tagged web page, wherein the hit is recorded when the session identification mechanism determines that the browsing request lacks a session tag.

13. The system according to claim 12, wherein the session identification mechanism includes:

a browsing request processing mechanism for processing the browsing request to identify an active browsing session as the browsing session of the browsing request;

an active session registry for registering active browsing sessions identified by the browsing request processing mechanism based on the session tag corresponding to each active browsing session of the active browsing sessions; and a session tag generation mechanism for generating, for a new browsing session, a new session tag which is used to register the new browsing session in the active browsing session registry.

14. The system according to claim 13, wherein the session tag generation mechanism includes:

a tag counter for recording a next available tag;

a tag counter initialization mechanism for initializing the tag counter;

a session tag generator for issuing the new session tag based on the next available tag; and a tag registration mechanism for registering the new session tag representing the new browsing session in the active session registry.

15. The system according to claim 12, wherein the session based browsing control mechanism includes:

a web page retrieval mechanism for retrieving a web page based on the browsing request from the client;

a web page tagging mechanism for tagging the retrieved web page to generate the tagged web page using the session tag for the browsing session associated with the client; and a session tag based hit recording mechanism for recording the hit at the web page from the client according to the session tag that uniquely identifies the browsing session associated with the client.

16. The system according to claim 15, wherein the web page tagging mechanism includes:
a tagged address generation mechanism for creating a tagged address using an address of the web page and the session tag;
a link identification mechanism for identifying an address of each link included in the web page; and
a tag insertion mechanism for inserting the session tag into the address of each link to generate a tagged link address for each link included in the web page.

17. A system for identifying a unique visitor behind a proxy server comprising:
a browsing request processing mechanism for processing a browsing request to identify an active browsing session as the browsing session of the browsing request;
an active session registry for registering active browsing sessions identified by the browsing request processing mechanism based on the session tag corresponding to each active browsing session of the active browsing sessions;
a session tag generation mechanism for generating, for a new browsing session, a new session tag which is used to register the new browsing session in the active browsing session registry; and
a session based browsing control mechanism coupled to the browsing request processing mechanism and the active session registry for generating a tagged web page based on the browsing request using a session tag generated by a webserver that uniquely identifies the client during the browsing session, and for recording a hit at the tagged web page according to the session tag indicated that a unique visitor has accessed the tagged web page, wherein the browsing request processing mechanism includes:
an address identifier for extracting an address of a requested web page from the browsing request;
a session tag extractor for extracting the session tag from the address of the requested web page; and
an active session determiner for identifying an active browsing session based on the extracted session tag and session tags registered in the active session registry.

18. A computer-readable medium encoded with a program for identifying a unique visitor behind a proxy server, having instructions which when executed cause:
sending, from a client located behind a proxy server connected to a network, a browsing request for a web page to a web server connected to the network;
receiving, by the web server, the browsing request;
identifying a browsing session according to a session tag associated with the browsing request, the session tag being generated by the web server; and
recording a hit at the web page from the client based on the session tag.

19. The computer-readable medium according to claim 18, further including:
sending, from the web server to the client via the network, the requested web page.

20. A computer-readable medium encoded with a program for identifying a unique web visitor behind a proxy server, having instructions which when executed cause:
receiving, by a web server, a browsing request for a web page on a web site from a client behind a proxy server;
determining if the browsing request includes a session tag;
generating, by the web server, a session tag to identify a unique visitor, when the browsing request lacks a session tag and associating the session tag with the browsing request;
identifying a browsing session according to a session tag associated with the browsing request; and
generating a tagged web page based on the web page and the session tag;
sending the tagged web page to the client via the proxy server; and
recording a hit at the web page from the client indicating that a unique visitor has accessed the web page based on the session tag.

21. The computer-readable medium according to claim 20, wherein the identifying a browsing session includes:
determining whether the browsing request from the client corresponds to a new browsing session or an existing browsing session;
identifying, if the browsing request corresponds to an existing browsing session, the session tag associated with the existing browsing session; and
generating, if the browsing request corresponds to a new browsing session, a new session tag for the new browsing session associated with the client.

22. The computer-readable medium according to claim 21, wherein the generating a session tag includes:
obtaining a next available tag to form the new session tag that uniquely identifies the new browsing session; and
registering the new session as an active browsing session using the new session tag.

23. The computer-readable medium according to claim 20, wherein the generating a tagged web page includes:
generating a tagged address for the web page based on the web page and the session tag;
identifying an address associated with each link in the web page;
inserting the session tag into the address associated with each link to generate a tagged link address for each link in the web page; and
generating the tagged web page based on the web page, the tagged address, and the tagged link address for each link in the web page.

24. A computer-readable medium encoded with a program for identifying a unique web visitor behind a proxy server, having instructions which when executed cause:
receiving, by a web server, a browsing request for a web page on a web site from a client behind a proxy server;
extracting, from the browsing request, a session tag;
determining that the browsing request corresponds to the new browsing session if the session tag can not be extracted from the browsing request;
determining that the browsing request corresponds to the existing browsing session that is associated with the extracted session tag;
determining whether the browsing request from the client corresponds to a new browsing session or an existing browsing session;

identifying, if the browsing request corresponds to an existing browsing session, the session tag associated with the existing browsing session; and generating, if the browsing request corresponds to a new browsing session, a new session tag for the new browsing session associated with the client;

generating a tagged web page based on the web page and the session tag;

sending the tagged web page to the client via the proxy server; and recording a hit at the web page from the client indicating that a unique visitor has accessed the web page based on the session tag.

* * * * *